US012025378B2

(12) United States Patent
Park

(10) Patent No.: US 12,025,378 B2
(45) Date of Patent: Jul. 2, 2024

(54) UNDERGROUND EQUIPMENT ELETRIC POWER SYSTEM WITHOUT AN EXTERNAL POWER SOURCE

(71) Applicant: KOREA SAFETY INDUSTRY CO., LTD., Seongnam-si (KR)

(72) Inventor: Seong-Heon Park, Gwacheon-si (KR)

(73) Assignee: KOREA SAFETY INDUSTRY CO., LTD., Seongnam-si (KR)

( * ) Notice: Subject to any disclaimer, the term of this patent is extended or adjusted under 35 U.S.C. 154(b) by 209 days.

(21) Appl. No.: 17/780,048

(22) PCT Filed: Nov. 26, 2020

(86) PCT No.: PCT/KR2020/016902
§ 371 (c)(1),
(2) Date: May 26, 2022

(87) PCT Pub. No.: WO2021/107628
PCT Pub. Date: Jun. 3, 2021

(65) Prior Publication Data
US 2022/0412657 A1    Dec. 29, 2022

(30) Foreign Application Priority Data

Nov. 26, 2019  (KR) .................... 10-2019-0153523

(51) Int. Cl.
*H02B 1/56* (2006.01)
*F28D 1/03* (2006.01)
(Continued)

(52) U.S. Cl.
CPC .................. *F28D 1/03* (2013.01); *F28F 3/02* (2013.01); *H02B 1/56* (2013.01); *H02B 7/08* (2013.01); *H02G 9/10* (2013.01)

(58) Field of Classification Search
None
See application file for complete search history.

(56) References Cited

U.S. PATENT DOCUMENTS 1,821,898 A * 9/1931 Rypinski ............ H02B 1/56
361/646
3,728,585 A * 4/1973 Olashaw ............ H02B 1/56
361/677
(Continued)

FOREIGN PATENT DOCUMENTS

JP    H07-312820 A    11/1995
JP    10-022135 A     1/1998
(Continued)

*Primary Examiner* — Krystal Robinson
(74) *Attorney, Agent, or Firm* — Bridgeway IP Law Group, PLLC; Sang Ho Lee; Hyun Woo Shin

(57) ABSTRACT

The present invention provides underground equipment enabling the internal heat of a buried box to be stably discharged to the outside without an external power source. In one embodiment, underground equipment comprises: a buried box of which the top is open; a cover part inserted into the buried box so as to cover the top; and air-conditioning parts which are disposed at the cover part, and which ventilate or close the inner space of the buried box according to the inflow of external water, wherein the inner space of the buried box is closed by means of the lower surface of the cover part, and a heat exchange part for allowing heat to be exchanged between rainwater and the inner space when the rainwater flows therein is disposed at a position of the cover part that differs from the arrangement position of the air-conditioning parts.

20 Claims, 5 Drawing Sheets

(51) Int. Cl.
*F28F 3/02* (2006.01)
*H02B 7/08* (2006.01)
*H02G 9/10* (2006.01)

(56) References Cited

U.S. PATENT DOCUMENTS

| | | | |
|---|---|---|---|
| 7,807,924 B2 * | 10/2010 | Wurzer | H02G 3/0493 |
| | | | 174/45 R |
| 8,813,916 B2 * | 8/2014 | Schilling | H05K 5/0213 |
| | | | 312/22 |

FOREIGN PATENT DOCUMENTS

| | | |
|---|---|---|
| KR | 20-0443588 Y1 | 2/2009 |
| KR | 10-2015-0040775 A | 4/2015 |
| KR | 10-1928167 B1 | 2/2019 |
| KR | 10-2127145 B1 | 6/2020 |

* cited by examiner

A-A'

B-B'

UNDERGROUND EQUIPMENT ELETRIC POWER SYSTEM WITHOUT AN EXTERNAL POWER SOURCE

TECHNICAL FIELD

The present invention relates to an underground apparatus.

BACKGROUND ART

In the related art, since electrical apparatuses such as transformers, switchgears, and communication devices are installed at upper ends of large ground structures such as electric poles, electric apparatus managers should climb on the electric poles to perform maintenance on the electrical apparatuses, and thus the maintenance of the electrical apparatuses is difficult and dangerous. Further, with the rapid industrialization of a modern society, as the demand for electrical apparatuses increases significantly, electrical apparatus-related structures such as the electric poles appear all over the city center. As a result, the electrical apparatus-related structures such as the electric poles are acting as factors that aesthetic aspects of the city center, disturb efficient use of a city center space, and threaten the safety of city residents.

In recent years, cable underground projects in which electric wires connected between these electrical apparatuses are buried underground and the electrical apparatus are installed on road surfaces such as sidewalks are being carried out. However, since the electrical apparatuses are installed on the road surfaces, cases in which the electrical apparatuses are flooding or damaged due to rainy seasons or typhoons that are repeated every year are frequently reported. Further, cases in which vehicles collide with the electrical apparatuses due to carelessness of a driver are frequently reported. The flooding of or damage to the electrical apparatuses causes fire, electric shock, and explosion, leading to enormous property loss and personal injury.

In this regard, Korean Patent Application Publication No. 10-2015-0040775 discloses a buried underground-type container system having a waterproof function for preventing flooding of devices installed underground and a cooling function for cooling the devices installed underground.

However, since a cooling unit operated by a power supply not only requires an external power supply but also should use electronic devices, the cooling unit may be damaged or malfunctioned, and thus when floods occur, the temperature inside a buried box cannot be maintained stably.

(Patent Document 1) Korean Patent Application Publication No. 10-2015-0040775 (published on Apr. 15, 2015).

DISCLOSURE

Technical Problem

The present invention is directed to providing an underground apparatus capable of stably radiating internal heat of a buried box to the outside without an external power source.

Technical Solution

The present invention provides the following underground apparatus.

One aspect of the present invention provides an underground apparatus including a buried box having an open upper portion, a cover part inserted into the buried box and covering the upper portion, and an air conditioning unit that is disposed in the cover part and ventilates or seals an inner space of the buried box according to inflow of external water, wherein the inner space of the buried box is sealed by a lower surface of the cover part, a heat exchange unit for exchanging heat between rainwater and the inner space when the rainwater is introduced is disposed at a location different from an arrangement location of the air conditioning unit in the cover part, the cover part includes an upper surface exposed to an outside, the heat exchange unit is disposed below the cover part, an upper surface of the heat exchange unit is spaced apart from the upper surface of the cover part and configured such that external water introduced into the cover part from the outside is introduced into a first space between the upper surface of the heat exchange unit and the upper surface of the cover part, the buried box has a stepped part on an inner surface thereof and a groove recessed inward from an outer surface of a lower portion of the stepped part in the outer surface, the cover part is disposed above the stepped part, a drainage path is formed by a gap formed at at least a portion of an inner edge of the buried box and the stepped part, and the drainage path is configured to communicate with the air conditioning unit and the first space, and a communication path is formed in the buried box so that the groove and the drainage path communicate with each other.

The communication path may extend in a direction perpendicular to a ground, the buried box may have a stepped portion between an upper outer surface and a lower outer surface, and the groove may be formed in the upper outer surface.

The air conditioning unit may be located inside a box, and the gap may be formed between the outer surface of the buried box facing the inner surface and the inner surface of the buried box in the box of the air conditioning unit.

The groove may be formed in each outer surface of the buried box.

The heat exchange unit may be formed of a material having a higher thermal conductivity than concrete, and a heat exchange fin may be formed at least one surface among the upper surface and a lower surface.

A road decking panel may be located above the heat exchange unit in the cover part.

A sealing part may be disposed at a lower edge of the heat exchange unit, the heat exchange unit may include an inner member and an outer member surrounding the inner member, and the inner member may have a higher thermal conductivity than the outer member.

A worker entrance part may be disposed at a location different from the heat exchange unit and the air conditioning unit in the cover part, and the worker entrance part and the air conditioning unit may be collinearly disposed.

Advantageous Effects

The present invention can stably protect a device disposed inside an underground apparatus by stably cooling a buried box even when a lot of rainwater is introduced, through the above structure.

[Description of Reference Numerals]

Figure 1:
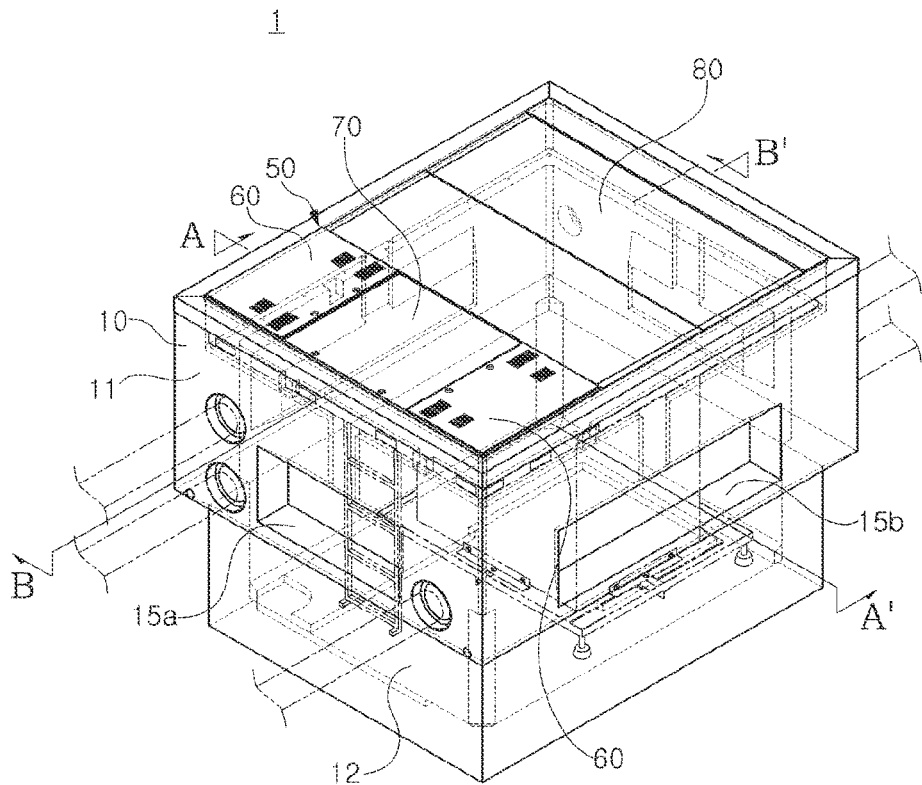
FIG. 1 is a perspective view of an underground apparatus according to an embodiment of the present invention.

| | |
|---|---|
| 1: Underground apparatus | 10: Buried box |
| 11: Outer surface | 15a, 15b, 15c, 15d: Groove |
| 17: Stepped part | 20: Communication path |
| 50: Cover part | 60: Air conditioning unit |
| 61: Air conditioner | 70: Worker entrance part |
| 80: Road decking panel | 100: Heat exchange unit |
| 105: Fin | A: First space |

MODES OF THE INVENTION

Hereinafter, detailed embodiments of the present invention will be described with reference to the accompanying drawings.

The present invention includes a buried box having an open above-ground part and a cover part inserted into the buried box to cover an upper portion according to one embodiment. The buried box is buried underground and the cover part has an upper surface exposed to the outside. An internal space of the buried box is sealed by the cover part, and even when the buried box is buried underground, external water is not introduced into the buried box.

However, an air conditioning unit and a heat exchange unit are disposed on the cover part in order to radiate heat generated inside the buried box to the outside, and a worker entrance part is also disposed on the cover part so that a worker may enter and exit the buried box. In the cover part, the air conditioning unit, the heat exchange unit, and the worker entrance part are disposed at different locations in a plan view, the respective components do not affect each other, and thus the introduced water is spread in balance.

In one embodiment, the present invention provides an underground apparatus capable of stably radiating heat in an internal space of the underground apparatus to the outside without a separate power while rainwater is introduced and an air conditioner fails to operate, the underground apparatus including the heat exchange unit that exchanges heat between water stagnated in an upper part of the underground apparatus and the internal space.

In one embodiment, the heat exchange unit may include a plate-shaped member formed of a material having a higher thermal conductivity than general concrete, for example, a metal plate, and a member such as a fin may be attached to one surface of the plate to increase heat exchange.

In one embodiment of the present invention, the rainwater stagnated in an upper portion of the heat exchange unit may be discharged to a surrounding land through a communication path formed below the buried box after rain or flood is finished. Since the communication path is formed downward, soil may not be introduced into the upper portion of the heat exchange unit.

In order to form such a communication path, in one embodiment of the present invention, the buried box includes a stepped part formed on an inner surface thereof and a groove formed in an outer surface thereof. The groove may be formed at a lower portion than the step part, and the communication path of the buried box extends from the stepped part on the inner surface to the groove in the outer surface.

In one embodiment, a space may be formed between an upper surface of the heat exchange unit and the upper surface of the cover part, and water may be introduced into this space. In one embodiment, the water is allowed to enter the heat exchange unit, and the water is used for heat exchange.

In one embodiment, a gap is present between an outer surface of the cover part and the inner surface of the buried box, a drainage path is formed by the gap and the stepped part, and the drainage path communicates with the air conditioning unit and a first space. For example, the air conditioning unit and the worker entrance part arranged in the cover part are disposed in a box-shaped structure, a gap is formed between an outer surface of the box-shaped structure and the inner surface of the buried box, the water introduced into the buried box may be evenly spread over the entire region through the drainage path, and thus the water may be also spread over the heat exchange unit. Further, the water inside the cover part may be evenly spread through the drainage path during drainage, and the drainage may be smoothly performed through the communication path disposed in the drainage path.

Figure 2:
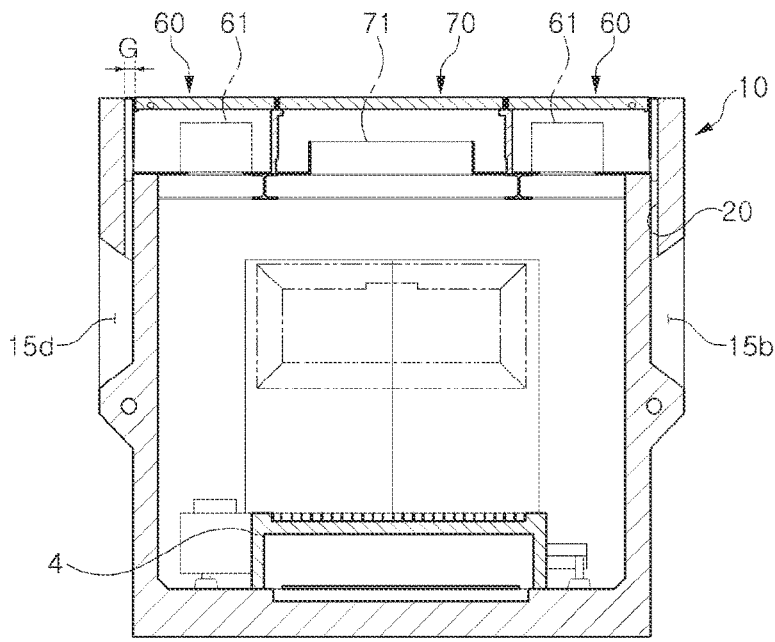
FIG. 2 is a cross-sectional view along line A-A of the underground apparatus of FIG. 1.
Figure 3:
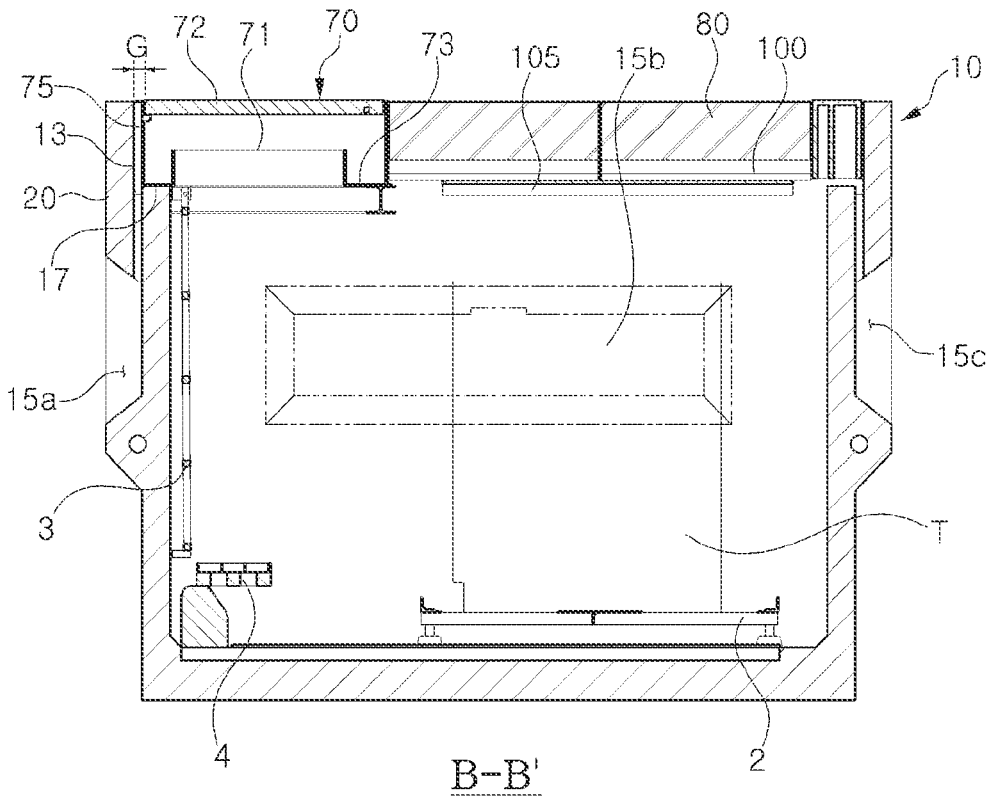
FIG. 3 is a cross-sectional view along line B-B of the underground apparatus of FIG. 1.
Figure 4:
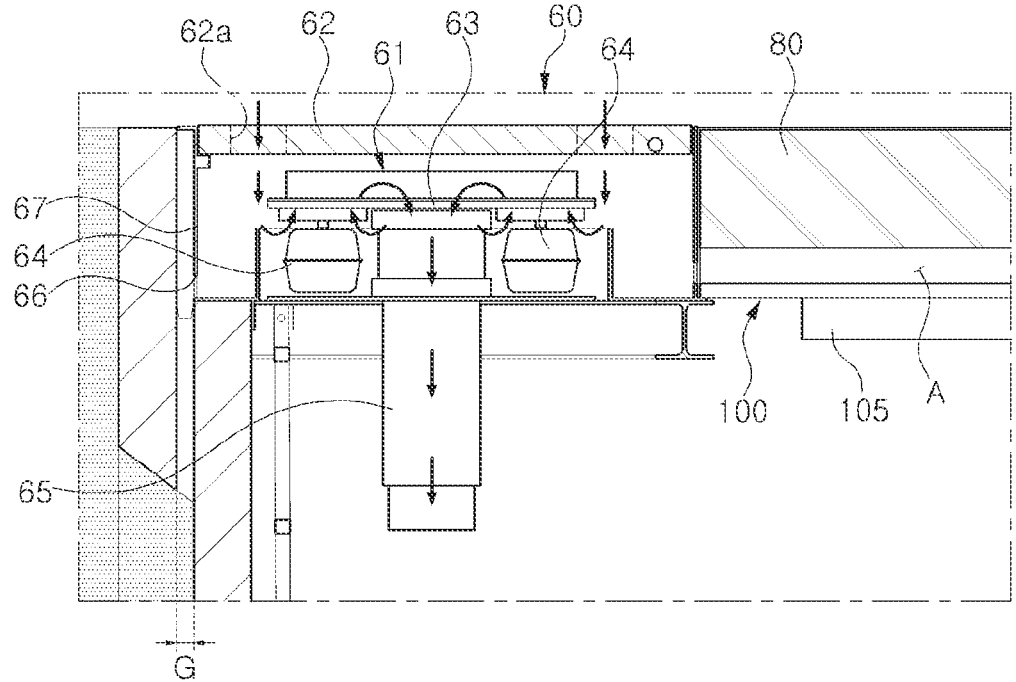
FIGS. 4 and 5 are enlarged cross-sectional views including an air conditioning unit and a heat exchange unit according to an embodiment of the present invention.
Figure 5:
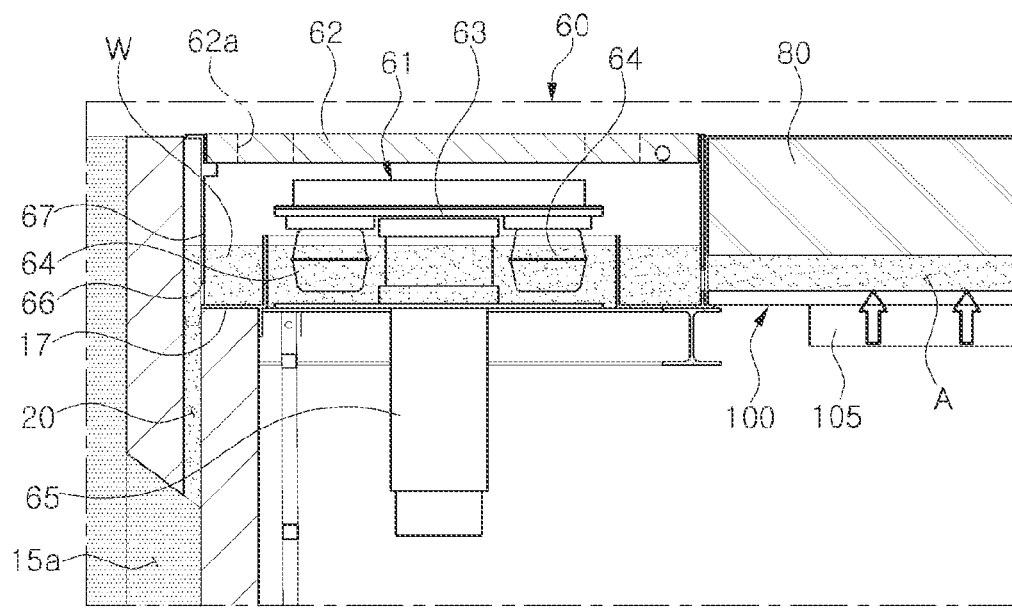
Figure 6:
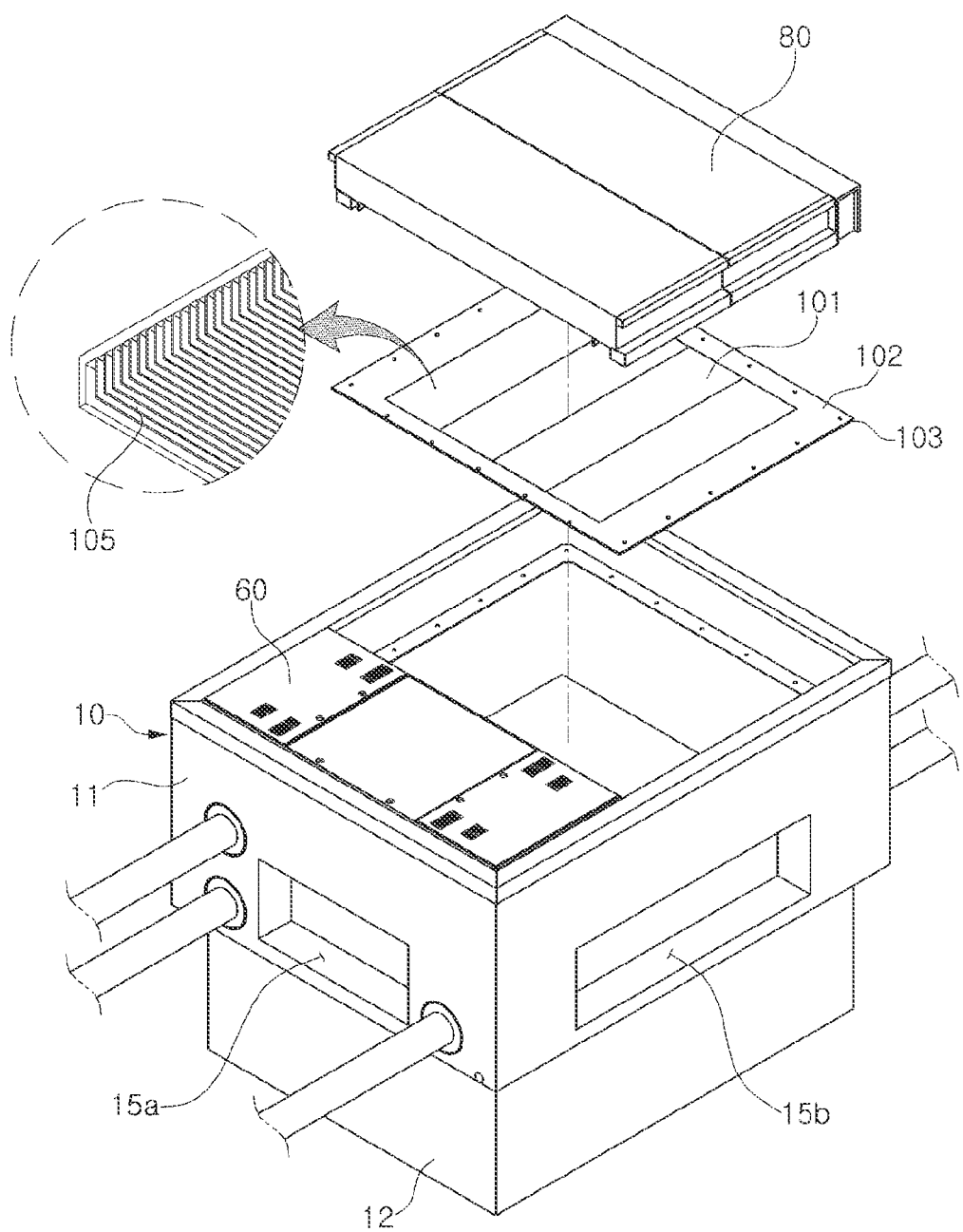
FIG. 6 is an assembly view of the underground apparatus according to an embodiment of the present invention that illustrates a process of assembling the heat exchange unit.

FIG. 1 is a perspective view of an underground apparatus according to an embodiment of the present invention. FIG. 2 is a cross-sectional view along line A-A of the underground apparatus of FIG. 1, and FIG. 3 is a cross-sectional view along line B-B of the underground apparatus of FIG. 1. FIGS. 4 and 5 are enlarged cross-sectional views including an air conditioning unit and a heat exchange unit according to an embodiment of the present invention, and FIG. 6 is an assembly view according to an embodiment.

As illustrated in FIGS. 1 to 3, the underground apparatus according to the embodiment includes a buried box 10 having an open upper portion, a cover part 50 inserted into the buried box 10 and covering the upper portion, and an air conditioning unit 60 that is disposed in the cover part and ventilates or seals an inner space of the buried box 10 according to inflow of external water, wherein the inner space of the buried box is sealed by a lower surface of the cover part 50.

The buried box 10 has a stepped portion between an upper outer surface 11 and a lower outer surface 12, and grooves 15a, 15b, 15c, and 15d recessed inward from the outer surface are formed in the upper outer surface 11. These grooves only reduce the amount of concrete to be injected but also provide a thin portion in which the concrete may be broken first when an explosion present thereinside.

The cover part 50 is disposed above the buried box 10 and has a portion inserted into the buried box 10. In a plan view, a region in which a road decking panel 80 is disposed, a region in which the air conditioning unit 60 is disposed, and a region in which a worker entrance part 70 is disposed are disposed not to overlap each other in the cover part 50. As illustrated in FIGS. 1 and 2, the worker entrance part 70 is collinearly disposed between the two air conditioning units 60. That is, the air conditioning unit 60, the worker entrance part 70, and the air conditioning unit 60 have the same length and are disposed in a line at one side. An upper surface of the cover part 50 is disposed to correspond to the ground, upper surfaces of the air conditioning unit 60, the worker entrance part 70, and the road decking panel 80 are disposed to correspond to the upper surface of the cover part 50, and thus a person or vehicle may pass on the upper surface of the cover part 50.

The air conditioning unit 60 is illustrated in FIGS. 4 and 5 in detail. The air conditioning unit 60 basically has a structure in which blocking of an air inlet/outlet path is controlled by buoyancy of an air bladder 64. The air conditioning unit 60 has a box shape, and an opening/closing unit 62 on the upper surface thereof is hinge-connected to a box at one side. Air conditioners 61 are disposed inside the box, an external air suctioning conditioner 61 is disposed in one of the two air conditioning units 60, and an internal air discharging conditioner 61 is disposed in the other air conditioning unit 60. A through-hole 62a is formed in the opening/closing unit 62, and through the through-hole 62a, external air may be introduced or internal air may be discharged.

The air conditioner 61 includes an internal passage 65 extending to the inner space of the buried box 10 and an external passage 63 disposed in the box, and one or more fans (not illustrated) are installed in at least one of the two passages. The air bladder 64 is disposed in the external passage 63, and the external passage 63 is blocked or opened as the air bladder 64 moves. That is, as the air bladder 64 floats on the water, the external passage 63 is blocked, and when the water is discharged and the air bladder 64 is lowered, the external passage 63 is opened.

A contact switch or proximity switch that is not illustrated is located above the air bladder 64 to turn on/off the fan installed in the air conditioner 61 as the air bladder 64 is lowered/raised. That is, when the air bladder 64 is raised, the air bladder 64 comes into contact with or approaches the switch, and accordingly, the fan is turned off. In contrast, when the air bladder 64 is lowered, the air bladder 64 is separated from or moves away from the switch, and accordingly, the fan is turned on.

In a box 67 of the air conditioning unit 60, a gap G is formed between an outer surface of the buried box 10 facing an inner surface and the corresponding inner surface of the buried box 10 as illustrated in FIG. 4. In particular, as illustrated in FIG. 3, an inner surface 13 of the buried box 10 has a stepped part 17, and the air conditioning unit 60, the worker entrance part 70, the road decking panel 80, and a heat exchange unit 100 are disposed on an upper side with respect to the stepped part 17.

As illustrated in FIGS. 2 and 3, the worker entrance part 70 includes a box shape and includes an outer cover 72 disposed on an upper surface of the box and an inner cover 71 disposed inside the box. The two covers may be opened/closed using a hinge. The inner cover 71 opens or closes the inner space of the buried box 10 and thus has a sealing structure to prevent external water from being introduced thereinto but the outer cover 72 does not need to have a sealing structure. A through-hole (not illustrated) may be formed in a lower surface of the box of the worker entrance part 70, and the through-hole allows the water introduced into the box of the worker entrance part 70 to be spread to other spaces, for example, upper portions of a drainage path, the air conditioning unit 60, and the heat exchange unit 100.

A ladder 3 is disposed below the inner cover 71 so that a worker may safely enter the inner space of the buried box 10, and a step 4 is disposed at a lower portion of the ladder 3.

Meanwhile, buried objects, for example, a transformer T and a support 2 disposed therebelow, are disposed in the inner space of the buried box 10, and as illustrated in FIG. 1, a plurality of wires connected to the transformer T are connected through the through-hole formed in the buried box 10. Since the through-hole is sealed in a state in which the wires or the like pass therethrough, external soil or water is not introduced into the inner space of the buried box 10. That is, when the air conditioner 61 is blocked and the inner cover 71 is closed, the inner space is isolated from the outside.

The road decking panel 80 is disposed in a space in which the air conditioning unit 60 and the worker entrance part 70 are not disposed, and the heat exchange unit 100 is disposed below the road decking panel 80. The heat exchange unit 100 may be disposed in the entire lower region of the road decking panel 80, and the road decking panel 80 may be disposed in a wider region or the heat exchange unit 100 may be disposed in a wider region.

The road decking panel 80 includes a frame and a leg 81, the leg may be placed on the heat exchange unit 100, but a lower surface 82 is disposed apart from an upper surface of the heat exchange unit 100. As illustrated in FIG. 4, a first space A is formed above the heat exchange unit 100. In other words, the upper surface of the heat exchange unit 100 is spaced apart from the upper surface of the cover part 50 or the lower surface (excluding the leg) of the road decking panel 80, and the first space A is formed between the upper surface of the heat exchange unit and the upper surface of the cover part 50 or the lower surface of the road decking panel 80. The first space A may be open or may be surrounded by the box shape.

A through-hole 66 may be formed below the box 67 of the air conditioning unit 60 and the box of the worker entrance part 70 so that the air conditioning unit 60, the worker entrance part 70, and the first space A communicate with each other.

The upper surface of the heat exchange unit 100 and the lower surfaces of the box of the air conditioning unit 60 and the box of the worker entrance part 70 may be formed to have the same height but may have slightly different heights. Thus, the water introduced into the air conditioning unit 60, the worker entrance part 70, and the first space A may move to other spaces and may move even to the stepped part 17.

The drainage path may be formed at a location corresponding to the gap G in the stepped part 17 of the buried box 10, and a communication path 20 vertically extending may be formed in the drainage path. The communication path 20 extends from the stepped part 17 formed on the inner surface 13 to the grooves 15a, 15b, 15c, and 15d formed in the outer surface, and the water introduced into the air conditioning unit 60, the worker entrance part 70, and the first space A may be discharged to soil disposed in the grooves 20 through the communication path 20. Since the communication path 20 is formed in an up-down direction, that is, a vertical direction, the water may be discharged through the grooves 15a, 15b, 15c, and 15d disposed therebelow, but the soil disposed in the grooves 15a, 15b, 15c, and 15d cannot enter the interior of the buried box 10 along the communication path 20.

As illustrated in FIG. 6, in an embodiment of the present invention, the heat exchange unit 100 may have a plurality of fins 105 protruding toward the inner space of the buried box 10. The heat exchange unit 100 includes an outer member 102 and an inner member 101, and a material having a higher thermal conductivity than the outer member 102 may be selected for the inner member 101. A sealing part 103, for example, a rubber layer, is disposed on a lower surface of an edge of the outer member 102, is fixedly connected to the stepped part 107 while being seated on the stepped part 107, and thus seals the inner space of the buried box 10. The fin 105 may be formed in the inner member 101.

Figure 7:
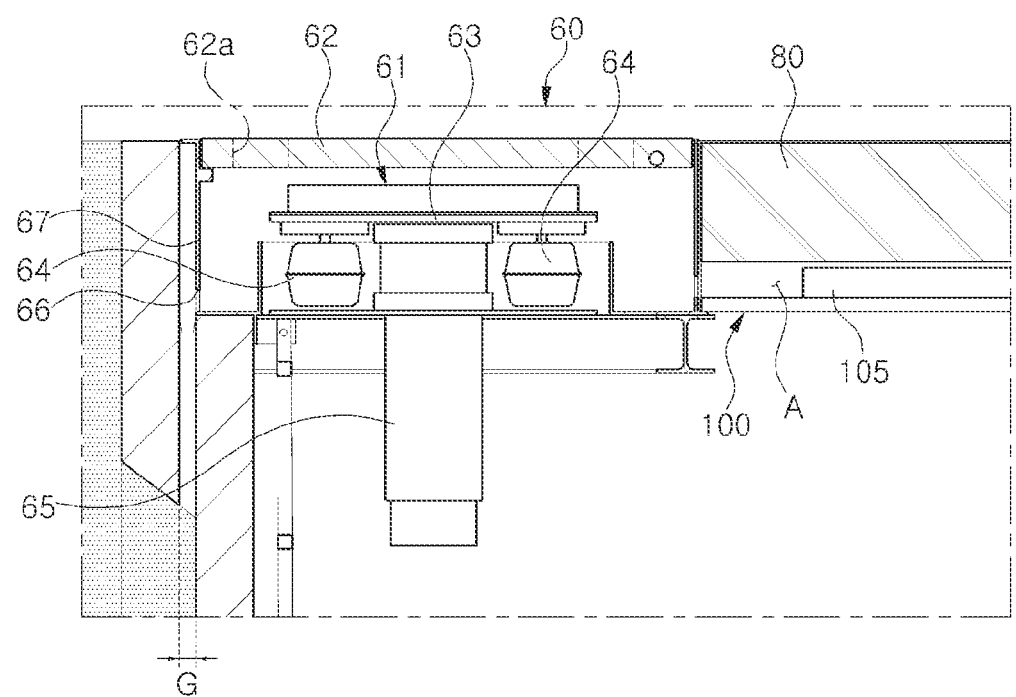
FIG. 7 is an enlarged cross-sectional view including an air conditioning unit and a heat exchange unit according to another embodiment of the present invention.

In the present embodiment, it has been described that the fin 105 protrudes toward the inner space of the buried box 10. However, as in an embodiment illustrated in FIG. 7, the fin 105 may protrude toward the first space A or may be formed toward the inner space of the buried box 10 and the first space A.

An operation of an embodiment of the present invention will be described through FIGS. 4 and 5.

As illustrated in FIG. 4, the air conditioner 61 is normally operated in a normal state, that is, in a state in which external water is not introduced, and air is introduced into or discharged from the inner space of the buried box 10 by the air conditioner 61. Thus, heat generated by the buried objects such as the transformer T (see FIG. 3) radiates to the outside through the air conditioner 61, and thus the inner space can be maintained at a constant temperature.

As illustrated in FIG. 5, external water W may be introduced and thus the air conditioner 61 may no longer operate. When the air conditioner 61 is operated, the external water is introduced into the first space A directly through a gap between the outer side of the cover part 50 and the road decking panel 80 or indirectly through the through-hole 62*a* of the air conditioning unit 60 and the through-hole 66. The water introduced into the first space absorbs heat transferred through the heat exchange unit 100 while being located on the upper surface of the heat exchange unit 100, and accordingly, the heat of the inner space of the buried box 10 is dissipated. That is, in the present embodiment, the introduced water blocks the air conditioner 61 and also acts as heat exchange fluid to dissipate heat of the inner space through the heat exchange unit 100.

In an embodiment, since internal heat is dissipated through the air conditioner when the external water W is not introduced and dissipated through the heat exchange unit 100 when the water is introduced, the temperature of the inner space cannot always exceed a certain temperature. In the case of the heat exchange unit 100, a separate power source is not required, the heat is transferred to the introduced water through conduction, and thus effective heat transfer can be achieved, and maintenance/management is also advantageous.

Hereinabove, embodiments have been mainly described with reference to the accompanying drawings of the present invention, but the present invention is not limited to the embodiments.

The invention claimed is:

1. An underground electric power system, comprising:
a box having an open upper portion;
a cover part inserted into the box and covering the upper portion; and
an air conditioning unit that is disposed in the cover part and ventilates or seals an inner space of the box according to inflow of external water,
wherein the inner space of the box is sealed by a lower surface of the cover part,
a heat exchange unit for exchanging heat between rainwater and the inner space when the rainwater is introduced is disposed at a location different from an arrangement location of the air conditioning unit in the cover part,
the cover part includes an upper surface exposed to an outside,
the heat exchange unit is disposed below the cover part, and
an upper surface of the heat exchange unit is spaced apart from the upper surface of the cover part and configured such that external water introduced into the cover part from the outside is introduced into a first space between the upper surface of the heat exchange unit and the upper surface of the cover part.

2. The underground electric power system of claim 1, wherein the communication path extends in a direction perpendicular to a ground, the box has a stepped portion between an upper outer surface and a lower outer surface, and a groove is formed in the upper outer surface.

3. The underground electric power system of claim 2, wherein the heat exchange unit is formed of a material having a higher thermal conductivity than concrete, and
a heat exchange fin is formed at least one surface among the upper surface and a lower surface.

4. The underground electric power system of claim 1, wherein the air conditioning unit is located inside a box, and
the gap is formed between the outer surface of the box facing the inner surface and the inner surface of the box in the box of the air conditioning unit.

5. The underground electric power system of claim 4, wherein the heat exchange unit is formed of a material having a higher thermal conductivity than concrete, and
a heat exchange fin is formed at least one surface among the upper surface and a lower surface.

6. The underground of claim 1, wherein a groove is formed in each outer surface of the box.

7. The underground electric power system of claim 6, wherein the heat exchange unit is formed of a material having a higher thermal conductivity than concrete, and
a heat exchange fin is formed at least one surface among the upper surface and a lower surface.

8. The underground electric power system of claim 1, wherein the heat exchange unit is formed of a material having a higher thermal conductivity than concrete, and a heat exchange fin is formed on at least one surface among the upper surface and a lower surface.

9. The underground electric power system of claim 8, wherein a road decking panel is located above the heat exchange unit in the cover part.

10. The underground electric power system of claim 8, wherein a worker entrance part is disposed at a location different from the heat exchange unit and the air conditioning unit in the cover part, and the worker entrance part and the air conditioning unit are collinearly disposed.

11. The underground electric power system of claim 1, wherein a sealing part is disposed at a lower edge of the heat exchange unit, the heat exchange unit includes an inner member and an outer member surrounding the inner member, and the inner member has a higher thermal conductivity than the outer member.

12. The underground electric power system of claim 1, wherein the box has a stepped part on an inner surface thereof and a groove recessed inward from an outer surface of a lower portion of the stepped part in the outer surface,
the cover part is disposed above the stepped part,
a drainage path is formed by a gap formed at at least a portion of an inner edge of the box and the stepped part, and the drainage path is configured to communicate with the air conditioning unit and the first space, and
a communication path is formed in the box so that the groove and the drainage path communicate with each other.

13. The underground electric power system of claim 1, wherein the air conditioning unit has a structure in which blocking of an inlet/out path is controlled by buoyancy of an air bladder.

14. The underground electric power system of claim 13, wherein the air conditioning unit has an internal passage extending to the inter space of the box and an external passage disposed in the box, and one or more fans are installed in at least one of the two passages.

15. The underground electric power system of claim 14, wherein the air bladder floats on the water, the external passage is blocked, and when the water is discharged and the air bladder is lowered, the external passage is opened.

16. The underground electric power system of claim 14, wherein a contact switch or proximity switch is located above the air bladder to turn on/off the fan installed in the air conditioner.

17. The underground electric power system of claim 16, wherein, when the air bladder is raised, the air bladder comes into contact with or approaches the switch, accordingly the fan is turned off, and when the air bladder is lowered, the air bladder is separated from or moves away from the switch, accordingly the fan is turned on.

18. An underground electric power system without power source comprising: a box having an open upper portion; a cover part inserted into the box and covering the upper portion; and an air conditioning unit that is disposed in the cover part and ventilates or seals an inner space of the box according to inflow of external water, the air conditioning unit configured to: seal, by a lower surface of the cover part, the inner space of the box; exchange heat, by a heat exchange unit, between rainwater and the inner space when the rainwater is introduced is disposed at a location different from an arrangement location of the air conditioning unit in the cover part; include, by the cover part, an upper surface exposed to an outside; dispose the heat exchange unit below the cover part; provide stable radiating heat in an internal space of the underground electric power system to the outside without a separate power when external waster is not introduced; and spaced an upper surface of the heat exchange unit apart from the upper surface of the cover part and configured such that external water introduced into the cover part from the outside is introduced into a first space between the upper surface of the heat exchange unit and the upper surface of the cover part.

19. The underground electric power system without power source of claim 18, wherein the air conditioning unit has a structure in which blocking of an inlet/out path is controlled by buoyancy of an air bladder.

20. The underground electric power system without power source of claim 19, wherein the air conditioning unit has an internal passage extending to the inter space of the box and an external passage disposed in the box, and one or more fans are installed in at least one of the two passages.

* * * * *